Figure 1:
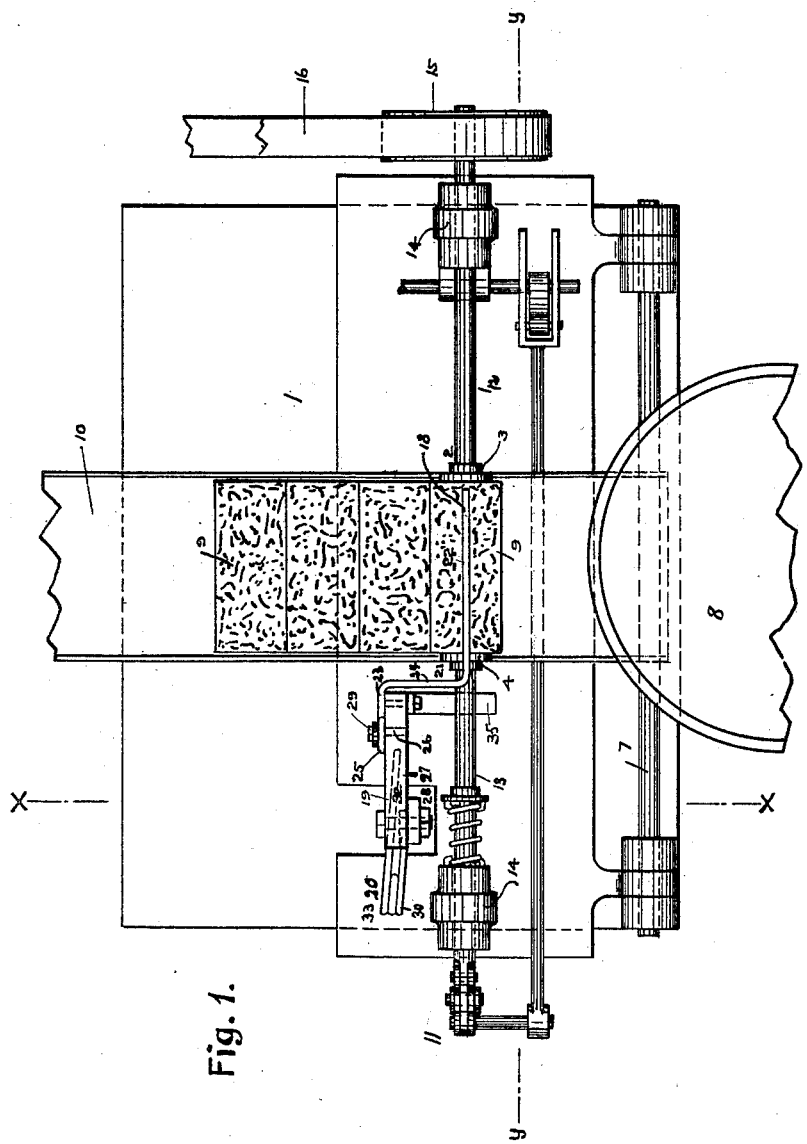

No. 713,865. Patented Nov. 18, 1902.
A. FABRE.
COR K CUTTING AND TAPERING MACHINE.
(Application filed May 25, 1901. Renewed Oct. 7, 1902.)
(No Model.) 2 Sheets—Sheet 1.

WITNESSES:
M. M. Durkin.
L. Duane,

INVENTOR
Anthony Fabre,
BY
J. R. Littell,
his ATTORNEY.

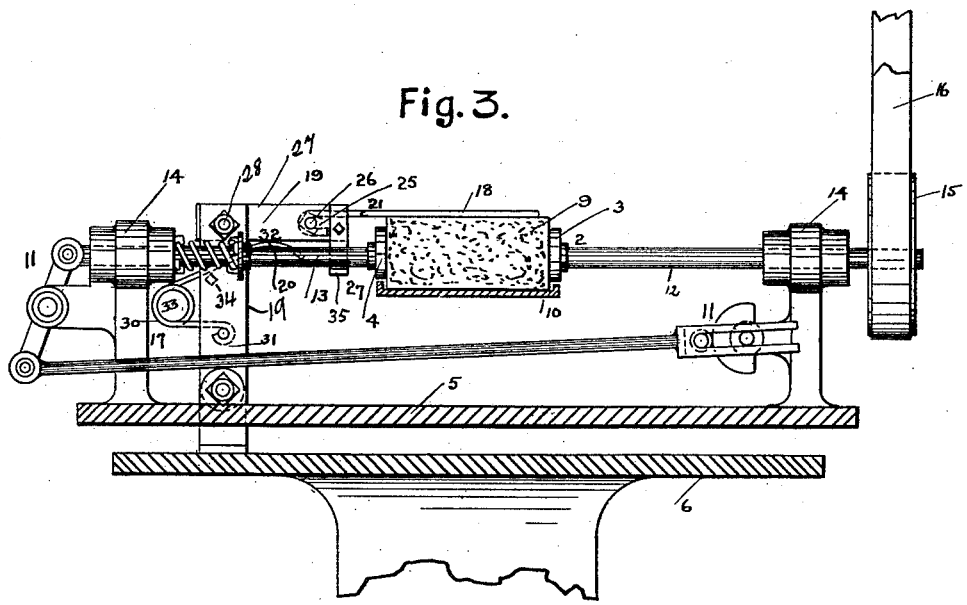

UNITED STATES PATENT OFFICE.

ANTHONY FABRE, OF NEW YORK, N. Y.

CORK CUTTING AND TAPERING MACHINE.

SPECIFICATION forming part of Letters Patent No. 713,865, dated November 18, 1902.

Application filed May 25, 1901. Renewed October 7, 1902. Serial No. 126,369. (No model.)

*To all whom it may concern:*

Be it known that I, ANTHONY FABRE, a citizen of the Republic of France, residing at New York, in the county and State of New York, have invented certain new and useful Improvements in Cork Cutting and Tapering Machines, of which the following is a specification.

This invention relates to cork cutting and tapering machines; and it has for its object to provide an improved machine of this class embodying means for maintaining a cork blank in proper position for cutting or tapering. In machines of the class under consideration as ordinarily constructed the cork blank is gripped in a chuck provided with movable jaws, and the chuck is elevated at the proper moment to present the cork blank to a circular cutter which cuts or shapes the same into cork form. The movable jaw of the chuck when it is brought into engagement with the cork blank has a tendency to displace the same from the true flat-lying position, so that when the blank is finally gripped between the two jaws of the chuck it is out of true and is destroyed in the cutting or shaping operation. My improvements, however, embody an element which is brought to bear upon the blank at the proper moment and maintains the same in proper flat-lying position during the gripping of the blank in the chuck, so that the blank is elevated into position for the cutting or shaping operation in perfectly true arrangement.

In the drawings, Figure 1 is a plan view of a portion of a cork-cutting machine embodying my improvements. Fig. 2 is a vertical transverse sectional view of the same, taken upon the line $x$ $x$, Fig. 1. Fig. 3 is a detail longitudinal sectional view taken upon the line $y$ $y$, Fig. 1.

Corresponding parts in all the figures are denoted by the same reference characters.

Referring to the drawings, 1 designates a portion of a cork-cutting machine embodying my improvements and provided with the customary chuck 2, which embodies a fixed jaw 3 and a relatively movable jaw 4. The chuck 2 is mounted upon a frame 5, which is pivoted upon the base 6 of the machine and which may be mounted upon a rock-shaft 7 for oscillation to move the chuck 2 into and out of operative position with respect to a circular horizontal cutter 8. The blanks 9 are fed to the chuck 2 in the customary manner through a chute or trough 10 and are successively elevated from the trough by the chuck 2 into operative position with respect to the cutter 8.

11 designates means for causing the endwise movement of the jaw 4 to engage and disengage the same with the blank. The jaws 3 and 4 are carried, respectively, by spindles 12 and 13, respectively, which spindles are journaled in standards 14 mounted upon the frame 5, and the spindle 12 of the jaw 3 may be provided with a pulley 15, whereby said spindle 12, together with the pulley 15, the jaws 3 and 4, and the blank 9 between said jaws, may be rotated in engagement with the cutter 8. The pulley 15 may be rotated by means of a belt 16, which is held in taut or operative condition when the blank has been raised by the frame 5 into position for the cutting operation.

17 designates my improved means for maintaining the cork blank in true arrangement, and said means 17 embody a projecting finger 18, which at the proper phase of operation of the machine is brought into positive binding engagement with the blank 9 to prevent displacement of the same in the trough or chute 10 while the blank is being grasped between the jaws 3 and 4 of the chuck. The finger 18 is carried by a bracket 19 and is capable of pivotal movement in a vertical plane, being normally maintained in elevated or inoperative position by suitable tensional means 20. The finger 18 is depressed at the proper phase of the movement of the frame 5 and is thus brought into engagement with the blank 9, which it holds firmly in position until grasped by the jaws 3 and 4.

The finger 18 is preferably somewhat elastic or resilient in nature and consists of a single length 21, of spring-wire, which comprises two parallel end portions 22 and 23, respectively, and a central transverse portion 24, which extends at right angles to said end portions. The end portion 22 constitutes the outer end of the finger 18 and is the part which is directly engaged with the blank. The inner end portion 23 is formed into a loop 25, which is hooked about a bolt 26, which is secured in the outer end portion of a short arm 27, which arm is pivoted to the upper end of the bracket 19, as at 28, and constitutes the means of pivotal connection of the finger 18 with the bracket 19. The finger 18 is adjustably secured in connection with the bolt 26 by means of a nut 29, and it is manifest that the finger 18 by means of the loop 25 in the wire 21 may be adjusted longitudinally as well as pivotally and may be secured in position of adjustment by the nut 29. The tensional means 20 may consist of a single length of spring-wire 30, one end of which is secured to the bracket 19, as at 31, and the other end of which bears upon the under side of the arm 27, as at 32. The length of wire 30 is bent and coiled centrally, as at 33, to obtain the requisite tensional effect. The upward play of the finger 18 is limited by means of a stop 34, which is formed upon or secured to the upper end of the bracket 19 beneath the point 28 of pivotal connection of the arm 27 and the bracket 19. This stop is engaged by the inner end of the arm 27 when the finger 18 has reached a predetermined point of pivotal elevation. The arm 27 also carries a laterally-projecting angular finger 35, which is engaged at the proper moment in the depression or downward movement of the frame 5 by the spindle 13.

The operation and advantages of my improvements in cork cutting and tapering machines will be readily understood by those skilled in the art to which it appertains. As the frame 5 is lowered after the cutting or tapering of one of the blanks 9 by means of the cutter 8 the spindle 13 engages with the angular finger 35 and forces the spring-finger 18 downwardly against the tensional means 20. In this manner the spring-finger 18 being pivotally depressed by means of the connection of its carrying-arm 27 with the bracket 19, the outer end portion of said spring-finger is brought to bear upon the next cork blank 9 in the trough or chute 10 to be gripped and elevated by the chuck 2. The means 11 for reciprocating the jaw 4 of the chuck 2 move said jaw 4 toward the jaw 3, and while the fresh blank 9 is held firmly in position by means of the finger 18 force the jaw 4 into engagement with one side of the blank 9 and move said blank into engagement with the jaw 3 at the other side. In this manipulation of the means for gripping the blank by the jaws 3 and 4 the finger 18 prevents upsetting or displacement of the blank 9 by the contact of the jaw 4 with the same and causes the blank to be finally gripped between the jaws 3 and 4 in perfectly true and square position, so that the cutter 8 may subsequently cut or shape the blank 9 into a cork of true symmetrical form and proper size. After the blank 9 is so gripped the frame 5 is raised until the blank 9 is brought into contact with the cutter 8, and the finger 18 follows the movement of the frame 5 and remains in contact with the blank 9 until a predetermined elevation of the frame has occurred, at which point the spindle 13 is disengaged from the angular finger 35 and the spring-finger 18 rises into free position under the impulse of the tensional means 20. The finger 18 rises to a sufficient height to prevent its obstruction of the several parts of the machine during the operation of cutting or tapering the cork blank by means of the cutter 8. When the frame 5 has risen to the required height, the belt 16 is tautened and causes the revolution of the pulley 15 to revolve the spindle 12, the jaws 3 and 4, the blank 9, the spindle 13, and the cork blank is cut or tapered in the customary manner by the circular cutter 8, which operates upon the revolving cork blank 9. After the blank is cut or tapered the frame 5 is lowered and the means 11 for reciprocating the spindle 13 withdraw the jaw 4 from the finished blank 9, which falls or is removed from the chuck 2 in the customary manner.

It will be noted that the spring-finger 18 effectually bears upon the blank 9 to hold the same in position in the trough or chute 10 during the entire period in which it is being gripped by the chuck 2, causing the blank to be squarely gripped by the chuck, with the result that the blank is presented to the circular cutter 8 in true position for cutting or tapering. The spring-finger is automatically operated in the movement of the frame 5 and does not interfere with the operation of any of the elements of the machine nor necessitate the lowering of the speed of the machine. It results, therefore, that as many corks may be turned out in a machine embodying my improvements as in any machine as ordinarily constructed and that all of the corks will be perfectly cut or tapered, thus obviating all loss of material.

I do not desire to be understood as limiting myself to the details of construction and arrangement as herein described and illustrated, as it is manifest that variations and modifications may be made in the features of construction and arrangement in the adaptation of the device to various conditions of use without departing from the spirit and scope of my invention and improvements. I therefore reserve the right to all such variation and modification as properly fall within the scope of my invention and the terms of the following claims.

Having thus described my invention, I claim and desire to secure by Letters Patent—

1. In a machine of the class described provided with means for feeding the blanks and means for gripping the blank for the cutting and tapering operation, means for maintaining the blank in true position during the gripping operation, said last-named means embodying a pivoted adjustable finger capable of endwise and vertical adjustment and adapted to be brought into operative position in the movement of the frame carrying the gripping means.

2. In a machine of the class described provided with means for feeding the blanks and means for gripping the blank for the cutting and tapering operation, means for maintaining the blank in true position during the gripping operation, said last-named means embodying a finger having two parallel end portions and a central transverse portion the outer end portion adapted to directly engage the blank and the inner end portion provided with a loop adjustably secured on the frame of the machine, said finger being adapted to be brought into operative position in the movement of the frame carrying the gripping means.

3. In a machine of the class described provided with means for feeding the blanks and means for gripping the blank for the cutting and tapering operation, means for maintaining the blank in true position during the gripping operation, said last-named means comprising a standard carried by the frame of the machine, an arm pivoted on the standard, tensional means carried by the standard and normally pressing the arm upward, and an elastic finger carried by the arm and capable of endwise and vertical adjustment and adapted to be brought into operative position in the movement of the frame carrying the gripping means.

4. In a machine of the class described provided with means for feeding the blanks and means for gripping the blank for the cutting and tapering operation, means for maintaining the blank in true position during the gripping operation, said last-named means comprising a standard mounted on the frame of the machine, an arm pivoted on the standard and provided with a laterally-projecting angular finger for engaging the frame carrying the gripping means and depressing the arm, a spring having a central coil and secured at one end on the standard and bearing at the other end on the under side of the arm, and an elastic finger having two parallel end portions and a central transverse portion the outer end portion adapted to directly engage the blank and the inner end portion provided with a loop adjustably secured to the end of the arm.

In testimony whereof I have signed my name in the presence of the subscribing witnesses.

ANTHONY FABRE.

Witnesses:
   GEORGE VAIL HUPPERTZ,
   J. R. LITTELL.